(12) United States Patent
Semwal et al.

(10) Patent No.: US 10,805,201 B2
(45) Date of Patent: *Oct. 13, 2020

(54) METHOD AND SYSTEM FOR INITIALIZING THE BORDER GATEWAY PROTOCOL ON NETWORK DEVICES

(71) Applicant: Arista Networks, Inc., Santa Clara, CA (US)

(72) Inventors: Rajesh Semwal, Sunnyvale, CA (US); Mohammad Imtiyaz, Bangalore (IN)

(73) Assignee: Arista Networks, Inc., Santa Clara, CA (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/124,175

(22) Filed: Sep. 6, 2018

(65) Prior Publication Data
US 2019/0007297 A1  Jan. 3, 2019

Related U.S. Application Data

(63) Continuation of application No. 15/382,880, filed on Dec. 19, 2016, now Pat. No. 10,097,445, which is a
(Continued)

(51) Int. Cl.
*H04L 12/751* (2013.01)
*H04L 29/06* (2006.01)

(52) U.S. Cl.
CPC ............ *H04L 45/02* (2013.01); *H04L 65/102* (2013.01); *H04L 65/1069* (2013.01)

(58) Field of Classification Search
CPC .... H04L 45/02; H04L 65/102; H04L 65/1069
See application file for complete search history.

(56) References Cited

U.S. PATENT DOCUMENTS

| 6,704,795 B1* | 3/2004 | Fernando ............... H04L 45/02 709/237 |
| 7,710,899 B1* | 5/2010 | Ward ..................... H04L 45/02 370/254 |
| 8,155,129 B2 | 4/2012 | Appanna et al. |

OTHER PUBLICATIONS

Sangli et al RFC 4724 Graceful Restart Mechanism for BGP, Network Working Group, published Jan. 2007.*
(Continued)

*Primary Examiner* — Khaled M Kassim
*Assistant Examiner* — Zhaohui Yang
(74) *Attorney, Agent, or Firm* — Chamberlain, Hrdlicka, White, Williams & Aughtry

(57) ABSTRACT

A method for initializing the border gateway protocol (BGP) on network devices. The method includes initializing, by a first network device, a BPG session with a second network device. The method further includes receiving, by the first network device from the second network device, route updates and an end of routing information base (EOR) marker. The method further includes updating an n_EOR variable maintained by the first network device after receiving the EOR marker and, after updating the n_EOR variable, determining that the first network device has received route updates from all peer network devices, and subsequently updating, in the first network device, a routing information base (RIB) using route updates received from the peer network devices. The method further includes updating, in the first network device, a forwarding information base (FIB) using the updated RIB and advertising, to all peer network devices by the first network device, routes.

14 Claims, 6 Drawing Sheets

Related U.S. Application Data continuation of application No. 14/620,940, filed on Feb. 12, 2015, now Pat. No. 9,559,936.

(56) References Cited

OTHER PUBLICATIONS

S. Sangli et al.; "Graceful Restart Mechanism for BGP"; Network Working Group, RFC 4724, Jan. 2007.

* cited by examiner

METHOD AND SYSTEM FOR INITIALIZING THE BORDER GATEWAY PROTOCOL ON NETWORK DEVICES

CROSS-REFERENCE TO RELATED APPLICATIONS

This application is a continuation application of U.S. patent application Ser. No. 15/382,880, filed on Dec. 19, 2016, and entitled: "METHOD AND SYSTEM FOR INITIALIZING THE BORDER GATEWAY PROTOCOL ON NETWORK DEVICES." In turn, U.S. patent application Ser. No. 15/382,880 is a continuation application of U.S. patent application Ser. No. 14/620,940, filed on Feb. 12, 2015, and also entitled the same. Accordingly, this application claims benefit of U.S. patent application Ser. No. 15/382,880 and U.S. patent application Ser. No. 14/620,940 under 35 U.S.C. § 120. U.S. patent application Ser. No. 15/382,880 and U.S. patent application Ser. No. 14/620,940 are hereby incorporated by reference in their entirety.

BACKGROUND

Border network devices such as routers or multilayer switches are network devices that are used to manage the flow of data between different segments of a network. Border network devices may use the Border Gateway Protocol (BGP) to exchange reachability and routing information between the network segments.

SUMMARY

In general, in one aspect, the invention relates to a method for initializing the border gateway protocol (BGP) on network devices. The method includes initializing, by a first network device, a BPG session with a second network device. The second network device is one of multiple peer network devices. The method further includes receiving, by the first network device from the second network device, route updates and a first end of routing information base (EOR) marker. The method further includes updating an n_EOR variable maintained by the first network device after receiving the first EOR marker, and after updating the n_EOR variable, making a first determination, using the n_EOR variable, that the first network device has received route updates from each of the plurality of peer network devices. The method further includes, after making the first determination, updating, in the first network device, a routing information base (RIB) using route updates received from each of the multiple peer network devices to obtain an updated RIB, and updating, in the first network device, a forwarding information base (FIB) using the updated RIB. The method further includes advertising, to the multiple peer network devices by the first network device, routes. The routes are determined using the RIB.

In general, in one aspect, the invention relates to a network device. The network device initializes a BPG session with a second network device. The second network device is one of multiple peer network devices. The network device receives route updates and a first end of routing information base (EOR) marker from the second network device, updates an n_EOR variable after receiving the first EOR marker, and after updating the n_EOR variable, makes a first determination, using the n_EOR variable, that the network device has received route updates from each of the plurality of peer network devices. After making the first determination, the network device updates a routing information base (RIB) using route updates received from each of the plurality of peer network devices to obtain an updated RIB and updates a forwarding information base (FIB) using the updated RIB. The network device advertises, to the multiple peer network devices, routes. The routes are determined using the RIB.

In general, in one aspect, the invention relates to a non-transitory computer readable medium comprising instructions, that enable a network device to initialize a BPG session with a second network device. The second network device is one of multiple peer network devices. The instructions further enable the network device to receive, from the second network device, route updates and a first end of routing information base (EOR) marker, update an n_EOR variable maintained by the network device after receiving the first EOR marker and, after updating the n_EOR variable, make a first determination, using the n_EOR variable, that the network device has received route updates from each of the multiple peer network devices. The instructions further enable the network device to update, in the network device, after making the first determination, a routing information base (RIB) using route updates received from each of the plurality of peer network devices to obtain an updated RIB and update, in the network device, a forwarding information base (FIB) using the updated RIB. The instructions further enable the network device to advertise, to the multiple peer network devices, by the network device, routes. The routes are determined using the RIB.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-5, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to configuring a network device to perform routing of data packets in a network. More specifically, one or more embodiments of the invention include initializing a Border Gateway Protocol (BGP) on the network device. In one or more embodiments of the invention, the network device may establish BGP sessions with peer BGP network devices, i.e. it may connect to other BGP-capable network devices. During a convergence process, the network device may receive route updates, i.e. information about available routes to network destinations, from some or all of the peer BGP network devices with which the network device has established BGP sessions. The network device may add the received route updates to a routing information base (RIB) and may extract a best path for each network destination from the RIB. The network device may use the best paths identified to populate the forwarding information base (FIB) with next-hop information, thus enabling the network device to perform routing of data packets. The network device may advertise the best paths identified to the peer BGP network devices.

The following description describes some embodiments of the invention in which the network devices are routers. However, the invention is not limited to routers; rather embodiments of the invention may be extended to include other network devices (e.g. multi-layer switches).

Figure 1:
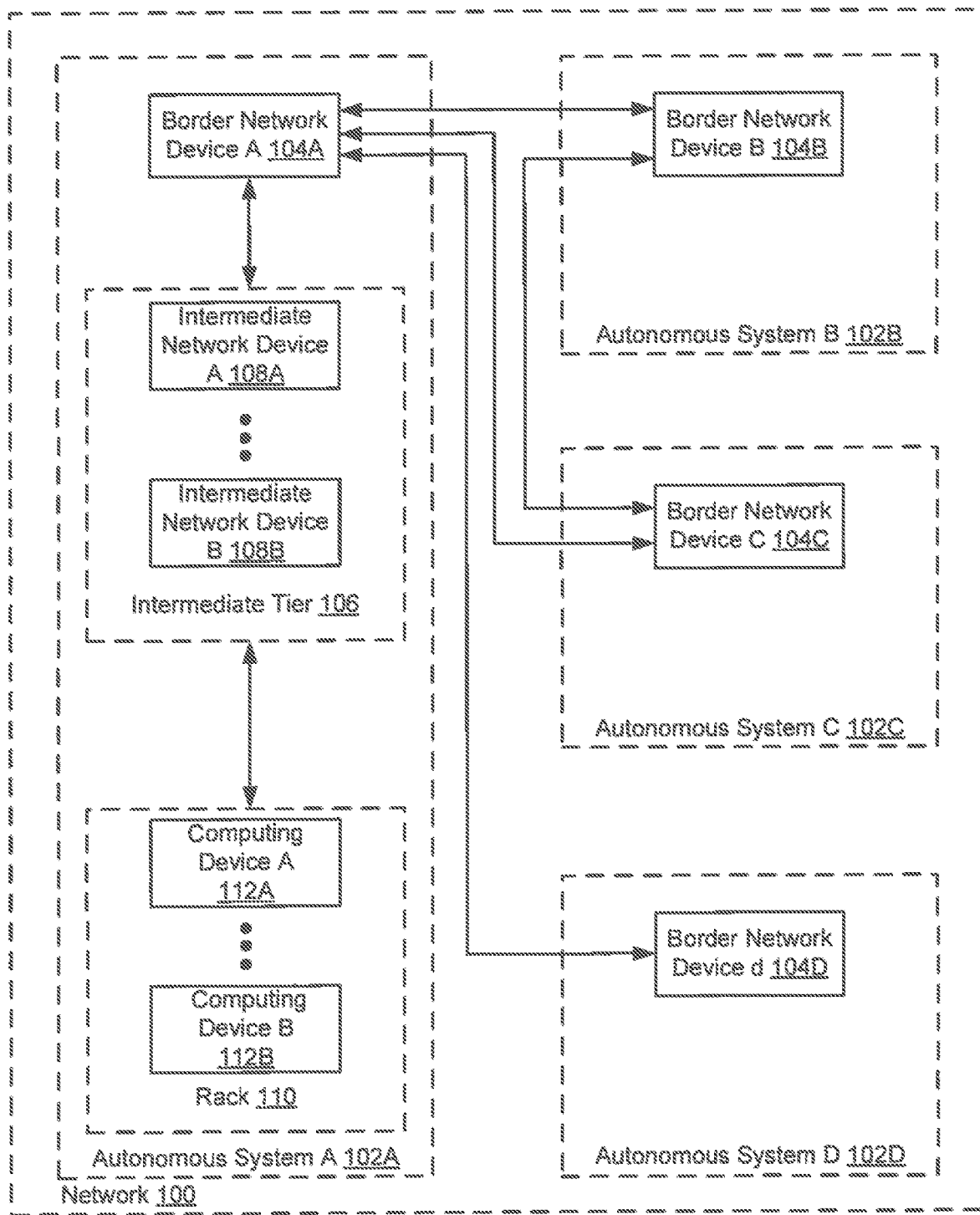
FIG. 1 shows a network that includes network devices in accordance with one or more embodiments of the invention.

FIG. 1 shows a network that includes networking devices in accordance with one or more embodiments of the invention. In one embodiment of the invention, the network (100) may include multiple autonomous systems (102A-102D). The autonomous systems may be interconnected by border network devices (104A-104D). An autonomous system may include computing devices (112A-112B) in a rack (110) and intermediate network devices (108A-108B), organized in an intermediate tier (106). Each of these components is described below.

An autonomous system is a domain with a uniform set of routing policies. In the example of autonomous system A (102A), this domain of uniform routing policies includes a set of computing devices (112A-112B) organized in a rack (110) and may be, for example, a set of computing devices and networking devices in a data center. Other autonomous systems may be substantially larger in size and complexity and may include, for example, an entire segment of the Internet under the administrative control of a network service provider.

The computing devices (112A-112B) may be workstations or servers such as, for example, database servers, application servers, mail servers or file servers. The computing devices (112A-112B) may be connected to the border network device (104A) via intermediate network devices (108A-108B) in the intermediate tier (106). The network devices (108A-108B) in the intermediate tier (106) may be routers and/or switches organized in, for example, a leaf-spine architecture.

In one or more embodiments of the invention, the border network device of an autonomous system may be connected to the border network devices of other autonomous systems. For example, border network device A (104A) interfaces with peer border network devices (104B-104D) to enable an exchange of data packets between the autonomous systems (102A-102D). In one or more embodiments of the invention, a border network device may be, for example, a router or a multilayer switch that includes executable instructions (stored on a non-transitory computer readable medium) and hardware (e.g., a processor, memory, persistent storage, etc.) configured to send packets to and receive packets from peer network devices. With the border network devices (104A-104D) enabling data exchange between the autonomous systems (102A-102D), computing device A (112A), for example, may exchange data with a computing device in autonomous system C (102C) via border network devices A (104A) and C (104C).

One skilled in the art will recognize that the architecture of a network is not limited to the components shown in FIG. 1. For example, the network may include additional autonomous systems of a wide range of size and complexity. In addition, autonomous systems with border network devices using BGP may exist inside autonomous systems. Further, the use of BOP is not limited to border network devices connecting autonomous systems. For example, BGP may be used for routing inside an autonomous system without departing from the invention.

In one or more embodiments of the invention, the network devices use the border gateway protocol (BGP) to communicate with peer BGP network devices. BGP is a standardized protocol, described by the IETF document RFC 4271, designed to exchange routing and reachability information between network devices. When a network device powers on, the network device's knowledge about the surrounding network infrastructure and available routes may be limited to the information stored in the network device's routing information base (RIB). The RIB may include information about the topology of the network surrounding the network device, the routes to network destinations, next-hop information, and metrics related to the routes. Next hop information may include the IP address of the next network device to which a packet is to be transmitted (i.e., sent) on the route toward the destination of the packet. Metrics may include, but are not limited to, information related to the route the packet may take towards its destination and may be represented by numerical values representative of the "cost" of the route. However, the RIB of the network device may be incomplete. For example, there may be no routing information for certain destination IP address ranges, and/or the cost of the routes stored in the network device's RIB may be higher than necessary, i.e. shorter routes, requiring fewer "hops" to a destination may exist. Therefore, when BGP is started on the network device, for example due to an initial boot of the network device, or in response to a command instructing the network device to restart BGP, the network device according to one or more embodiments of the invention, gathers routing information from peer BGP network devices. Peer BGP network devices may be established by manual configuration of the network device. In one embodiment of the invention, the network device has information about the identity of peer BGP network devices it may contact. The configuration includes the internet protocol (IP) addresses of these peer BGP network devices. In addition, the network device may have information about IP address ranges where dynamic BGP peers, i.e. BGP network devices without preset IP addresses, may or may not be available for peering.

In one or more embodiments of the invention, the network device passes through a convergence phase, during which the network device may contact peer BGP network devices, establish sessions with the peer BGP network devices, and subsequently gather routing information by receiving route updates from the peer BGP network devices. In one or more embodiments of the invention, the network device may accumulate all routing information received from the peer BGP network devices during the convergence phase, but may not immediately process the received routing information. Rather, the network device according to one or more embodiments of the invention may wait until termination of the convergence phase, before processing the routing information. In one or more embodiments of the invention, the convergence phase may terminate after a certain amount of time has elapsed or, for example, if all known peer BGP network devices have sent route updates to the network device. More specifically, the convergence phase may be divided into different phases, and the progression through the phases may be controlled by certain events. In one or more embodiments of the invention, there may be an "INIT" phase, during which the network device may wait for BGP sessions to be established between the network device and peer BGP network devices. During the "INIT" phase, termination of the BGP convergence process is not allowed, in order to give peer BGP network devices sufficient time to establish BGP sessions, and to provide route updates to the network device. The convergence may move from the "INIT" phase to an "ACTIVE" phase after a certain amount of time has elapsed. For example, convergence may progress from "INIT" to "ACTIVE" after a certain time has elapsed since the beginning of the convergence phase, or after a certain time has elapsed since the first peer BGP network device established a session with the network device. During the "ACTIVE" phase, the network device may be waiting to receive route updates from the peer BGP network devices having established BGP sessions with the network device. Additional BGP sessions may still be established during the "ACTIVE" phase. Progression to a "CONVERGED" state may occur, for example, if all known peer BGP network devices have provided route updates, or after a certain amount of time has elapsed. BGP convergence according to one or more embodiments of the invention may use counters to track BGP sessions established, and route updates received. In one embodiment of the invention, a counter may be incremented when a BGP session is established, and the counter may be decremented after receipt of a route update. Accordingly, a counter, that returns to zero after having been incremented due to BGP sessions established, and after having been decremented due to route updates received, may indicate successful receipt of all route updates for all BGP sessions established. In one or more embodiments of the invention, a counter may therefore be used to track the convergence progress. In one embodiment of the invention, multiple counters may be used, to track different types of peer BGP network devices. EOR-sending-capable peer BGP network devices may send a route update followed by an "end of routing information base" (EOR) marker (see IETF document RFC 4271 for a description). EOR-sending-capable devices may be, for example, devices that support "graceful restart" or the "graceful restart" helper mode. "Graceful restart" and graceful restart helper mode are mechanisms that eliminate the need for routing protocol re-convergence under certain conditions, and are supported by certain network devices. In one embodiment of the invention, a counter may be incremented when an EOR-sending-capable peer BGP network device establishes a BGP session. Correspondingly, the counter may be decremented, when the EOR marker following the route update is received. In one embodiment of the invention, a peer BGP network device may indicate that it may provide route updates for multiple address families, for example, for IPv4 and IPv6 address families. Each of the IPv4 and the IPv6 route updates may be followed by a separate EOR marker. For the purpose of tracking the progress of BGP convergence, a peer BGP network device that provides separate route updates for IPv4 and IPv6 address families may be treated as two separate peer BGP network devices. Accordingly, the counter may be incremented twice when the peer BGP network device establishes a BGP session. Subsequently, the counter may be decremented once when the EOR marker following the IPv4 update is received, and once when the EOR marker following the IPv6 updates is received. Other peer BGP network devices may not be EOR-sending-capable. Such peer BGP network devices may send a route update without a subsequent EOR marker. In one embodiment of the invention, a separate counter may be incremented when a peer BGP network device that is not EOR-sending-capable establishes a BGP session. The counter may be decremented, when a first KeepAlive marker is sent after transmission of the route update. A KeepAlive marker, however, may not be sent by the peer BGP network device immediately after the route update, thus potentially causing a delay in the tracking of the convergence progress. Some network devices may be configurable to send "expedited KeepAlive markers" immediately after transmission of the route update, thus not causing a delay in tracking the convergence progress.

Upon completion of the convergence phase, the network device may analyze the route updates added to the routing information base (RIB). The peer BGP network devices may have sent overlapping routing information, and the RIB of the network device may therefore contain redundant entries. In order to resolve these redundancies, the network device may identify, for each network destination, the best path. The network device may use the best paths identified to populate the forwarding information base (FIB) with next-hop information, thus enabling the network device to perform routing of data packets. Further, the network device may advertise the best paths identified to the peer BGP network devices.

FIGS. 2-4B show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 2-4B may be performed in parallel with any other steps shown in FIGS. 2-4B without departing from the invention.

Figure 2:
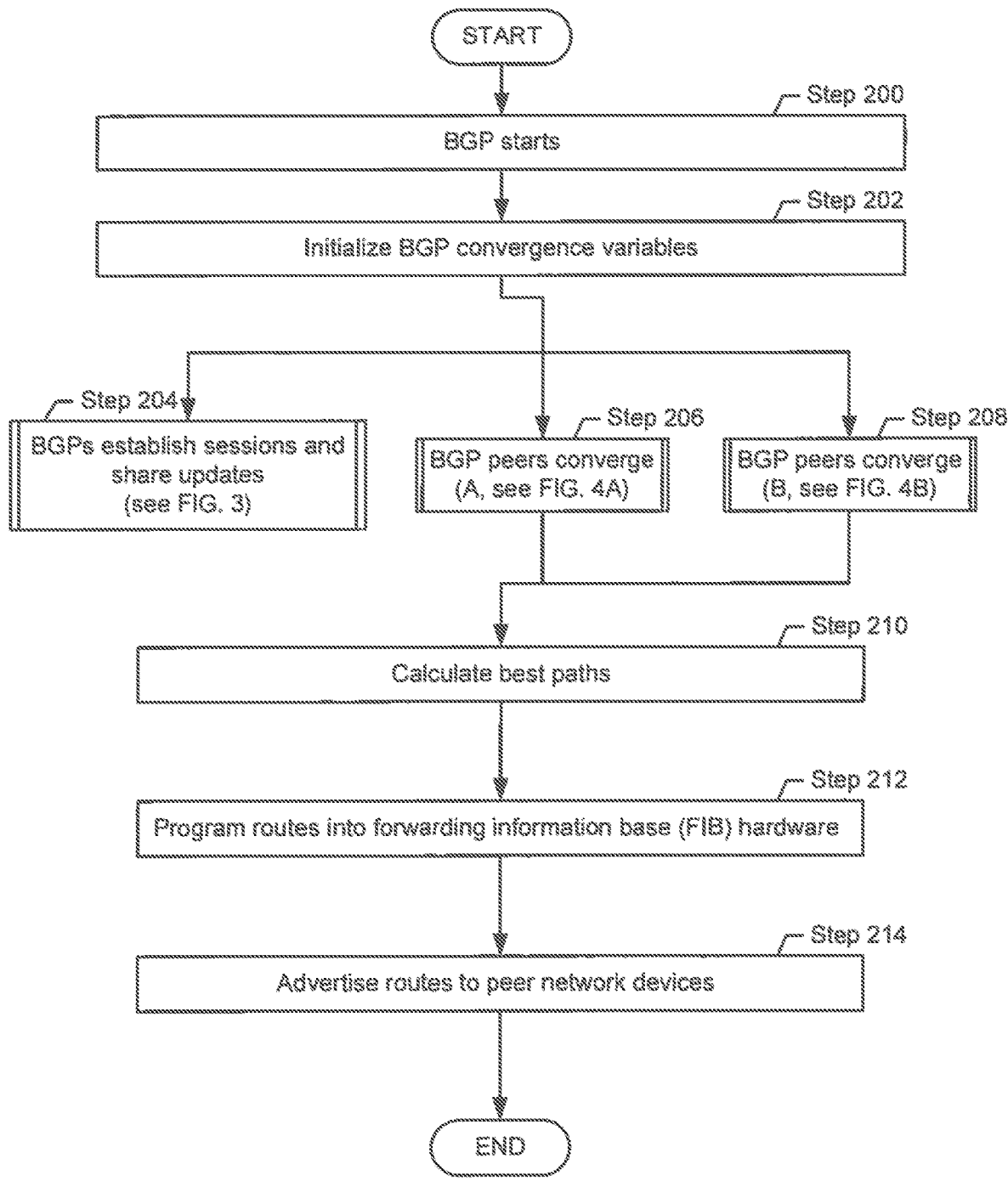
FIG. 2 shows a flowchart in accordance with one or more embodiments of the invention.

FIG. 2 shows a method for initializing the border gateway protocol (BGP) on network devices.

Turning to FIG. 2, in Step 200. BGP starts on a network device. Starting or restarting BGP may be necessary, for example, when a network device is powered on, or when an existing BGP session on a network device is restarted. Starting BGP prepares the network device to establish BGP sessions with peer BGP network devices. During the start of BGP, the network device loads a BGP configuration that is persistently stored in the network device. The BGP configuration may have been established manually by a system administrator and may include information about the identities and IP addresses of peer BGP network devices.

In Step 202, the network device initializes a set of variable and constants necessary for tracking the progression of the BGP convergence. The variables initialized include the number of EOR markers received, n_EORs, and the number of KeepAlive markers received, nKAs. Further, timeout limits I_P_TIMEOUT and C_TIMEOUT are set. In one embodiment of the invention, I_P_TIMEOUT may be used to limit the time during which the convergence method waits, for example, for slowly responding peer BGP network devices or dynamic peer BGP network devices. I_P_TIMEOUT may be set to, for example, 90 seconds. In one embodiment of the invention, C_TIMEOUT may be used to limit the time until BGP convergence is declared. C_TIMEOUT may be set to, for example, 300 seconds. I_P_TIMEOUT and C_TIMEOUT may be used to initialize and/or re-initialize a downward-counting timer during the execution of the convergence method. In addition an upward counting timer, elapsed_time, is started in Step 202 to track the time elapsed since the BGP convergence process was started. Further, a state variable, state, is initialized to an "NIT" state. The method of BGP convergence, uses the state variable to track the progression of BGP convergence, and to declare BOP convergence. The use of the variables and constants initialized in Step 202 is described in details in the following paragraphs and FIGS. 2-4B.

Steps 204, 206, and 208, describe a method for achieving BGP convergence according to one or more embodiments of the invention. During the BGP convergence phase, the network device establishes BGP session with peer BGP network devices and receives route updates. Steps 204, 206, and 208 may be executed in parallel.

In Step 204, the network device establishes sessions with peer BGP network devices and receives information about network topology and routes from the peer BGP network devices. The method described by Step 204 is repeated until Step 206 or Step 208 declare convergence. The details of Step 204 are described in FIG. 3.

In Step 206, the network device monitors the progress of the ongoing BGP convergence. In Step 206 convergence may be declared if certain conditions are met. For example, convergence may be declared in Step 206 after a certain amount of time has elapsed. The details of Step 206 are described in FIG. 4A.

In Step 208, the network device monitors the progress of the ongoing BGP convergence. In Step 208 convergence may be declared if certain conditions are met. For example, convergence may be declared in Step 208 after all peer BGP network devices that have an established BGP session with the network device, have sent route updates. The details of Step 208 are described in FIG. 4B.

In Step 210, after BGP convergence has been reached, the network device may processes all the information accumulated during the convergence phase. The network device may calculate the best paths by analyzing the receive routing information for redundancies. If redundancies are detected, for example, multiple paths to the same destination, the network device may select the best paths found, for example, the paths with the fewest hops (i.e. the fewest network devices) to a destination.

In Step 212, the network device may program the hardware of the forwarding information base (FIB) with next-hop information derived from best paths identified in Step 210.

In Step 214, the network device may advertise the best paths identified to the peer BGP network devices.

Figure 3:
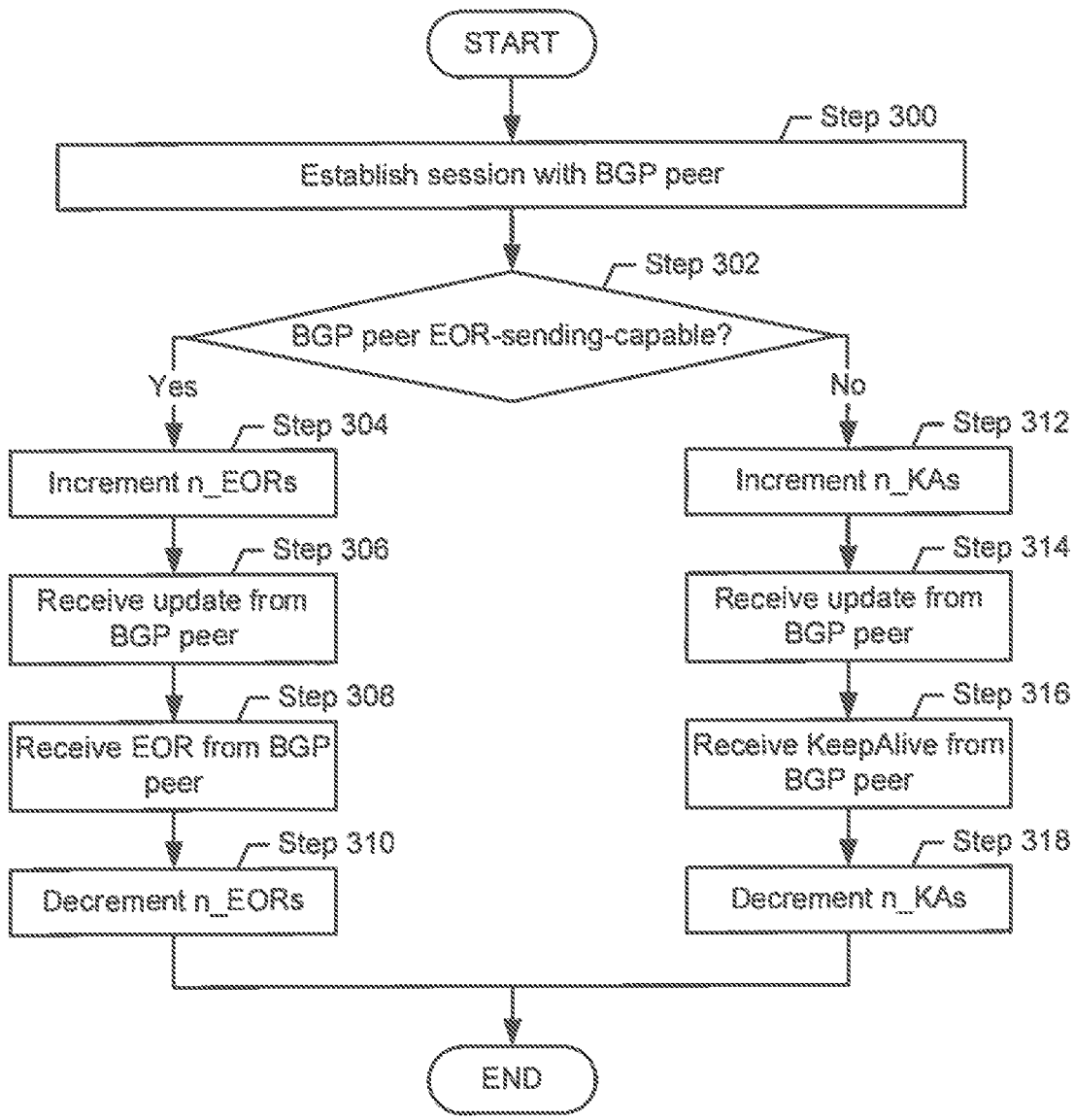
FIG. 3 shows a flowchart in accordance with one or more embodiments of the invention.

FIG. 3 shows a method for tracking BGP sessions established and routing updates received. The method described in FIG. 3 may be executed for each peer BGP network device that has been configured. Multiple instances of the method may execute in parallel for multiple peer BGP network devices. The method may execute completely, if a BGP session is established successfully, and the peer BGP network device provides route updates. The method may execute partially, if, for example, a BGP session with a peer BGP network device is established successfully, but the peer BGP network device fails to provide route updates. Further, the method may not execute at all for a peer BGP network device, for example, if the peer BGP network device does not respond to the request to establish a BGP session.

Turning to FIG. 3, in Step 300, the BGP network device establishes a BGP session with a peer BGP network device. First, the BGP network device sends a transmission control protocol (TCP) request to a configured peer BGP network device. If the peer BGP network device receives the TCP request, it responds and a TCP connection between the network device and the peer BGP network device is established. Next, the BGP device exchanges a BGP OPEN message to establish a BGP session. The OPEN message is used for identification of the network device and for negotiation of BGP session parameters, e.g., a device may indicate that it is EOR-sending-capable.

In Step 302, a determination is made about whether the peer BGP network device with the session established in Step 300 is EOR-sending-capable. If the peer BGP network device is EOR-sending-capable, the method may proceed to Step 304; otherwise the method may proceed to Step 312.

In Step 304, the counter for the number of EORs, n_EORs, is incremented in response to the BGP session established in Step 300. In one embodiment of the invention, a peer BGP network device may indicate that it may provide route updates for multiple address families, for example, IPv4 and IPv6. Each of the IPv4 and the IPv6 route updates may be followed by a separate EOR marker. For the purpose of tracking the progress of BGP convergence, a peer BGP network device that provides separate route updates for IPv4 and IPv6 address families may be treated as two separate peer BGP network devices. Accordingly, the counter for the number of EORs, n_EORs, may be incremented twice—once for each of the address families.

In Step 306, route updates are received from the peer BGP network device. The peer BGP network device may send route updates immediately after a BGP session with the peer BGP network device has been established, or it may send route updates after a delay.

In Step 308, an EOR marker, following the route update sent by the peer BGP network device, is received by the BGP network device.

In Step 310, the counter for the number of EORs, n_EORs, is decremented in response to the receipt of the EOR marker. If a peer BGP network device provides separate route updates for IPv4 and IPv6 address families, the counter for the number of EORs, n_EORs is decremented once when the EOR marker following the IPv4 update is received, and once when the EOR marker following the IPv6 updates is received.

Returning to Step 302, if a determination is made that the peer BGP network device with the session established in Step 300 is not EOR-sending-capable, the method may proceed to Step 312.

In Step 312, the counter for the number of KeepAlives, n_KAs, is incremented in response to the BGP session established in Step 300.

In Step 314, route updates are received from the peer BOP network device with the newly established BGP session. The peer BGP network device may send route updates immediately after a BGP session with the peer BGP network device has been established, or it may send route updates after a delay.

In Step 316, a KeepAlive marker is received by the BOP network device. KeepAlive markers may be sent by the peer BGP network device at regular intervals, for example, every 30 seconds. A KeepAlive marker may therefore not necessarily be sent immediately after the transmission of the routing update. If the peer BGP network device supports the "expedited KeepAlive" mode, a KeepAlive marker may be sent by the peer BGP network device immediately after the transmission of the routing update.

In Step 318, the counter for the number of KeepAlives, n_KAs is decremented in response to the receipt of a KeepAlive marker.

Figure 4A:
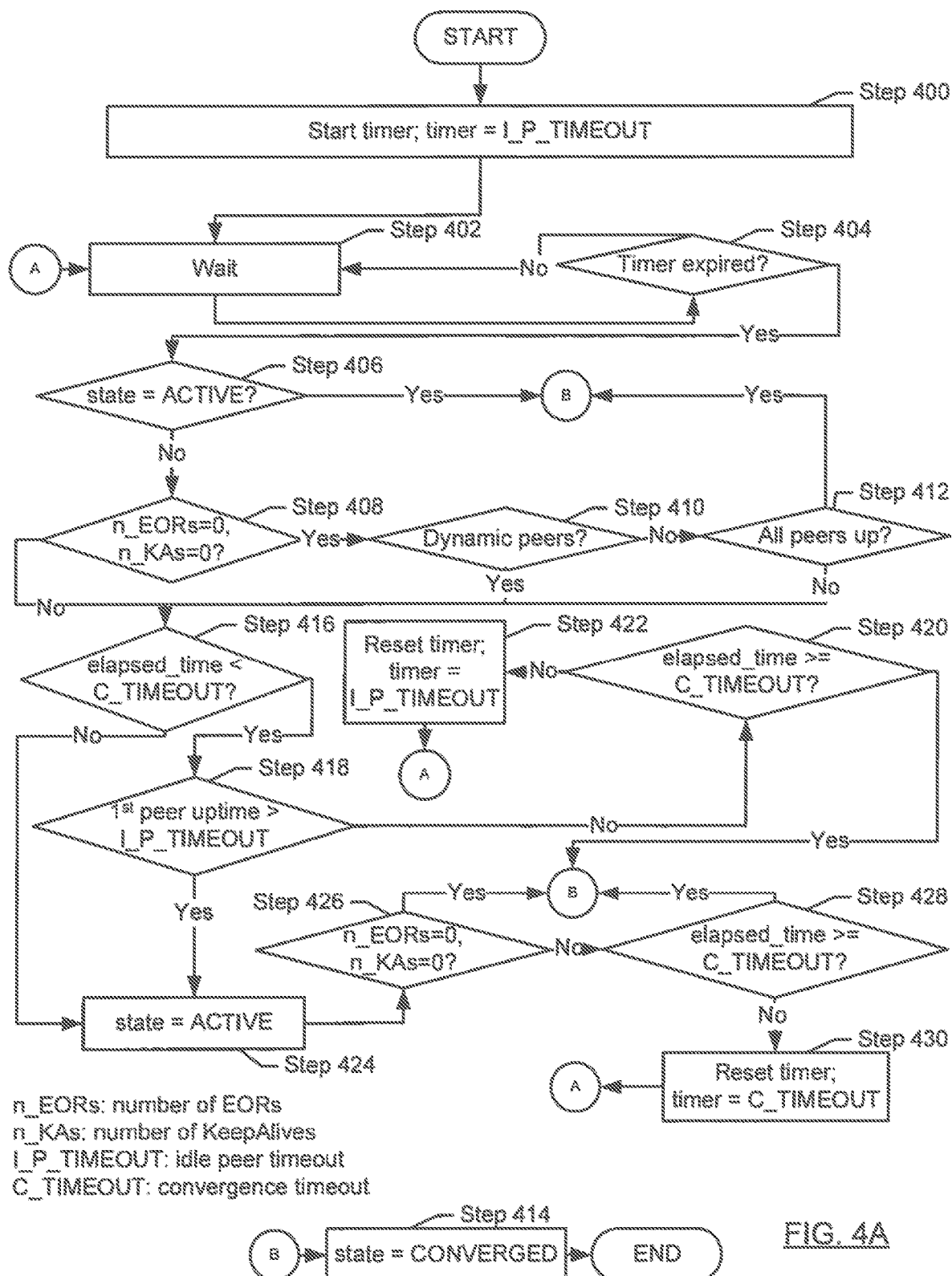
FIGS. 4A and 4B show flowcharts in accordance with one or more embodiments of the invention.

FIG. 4A shows a method for monitoring the progression of an ongoing BGP convergence process. The method shown in FIG. 4A is executed in conjunction with the method shown in FIG. 4B. The progression of the BGP convergence is reflected by a state variable "state". Prior to the execution of the method shown in FIG. 4A, the state variable has been initialized to the "INIT" state. In the "INIT" state, the network device may establish BGP sessions with peer BOP network devices, and the network device may receive route updates from the peer BGP network devices. Further, in the "INIT" state, the network device waits for additional peer BGP network devices to establish BGP sessions with the network device even though the wait may delay the progression of the BGP convergence. Under certain conditions, as described in detail in FIG. 4A and the following paragraphs, the state may transition to "ACTIVE". In the "ACTIVE" state, the network device may continue to establish sessions with peer BGP network devices, and peer BGP network devices with established sessions may continue to send route updates. However, in the "ACTIVE" state, the network device is not required to wait for additional peer BGP network devices to establish BGP sessions with the network device. Under certain conditions, as described in detail in FIG. 4A and the following paragraphs, the state may transition to "CONVERGED". In the "CONVERGED" state, the network device terminates the convergence process.

Turning to FIG. 4A, in Step 400, the BGP network device initializes the timer to the timeout value I_P_TIMEOUT and starts the timer. In one embodiments of the invention, the I_P_TIMEOUT timeout value may be, for example, 90 seconds.

In Step 402, the network device waits for the timer to expire. While in Step 402, the network device may perform other steps of the BGP convergence method, for example, steps described in FIG. 4B and/or FIG. 3.

In Step 404, a determination is made about whether the timer has expired. If the timer has not expired, the method may return to Step 402. If the timer has expired, the method may proceed to Step 406.

In Step 406, a determination is made about whether the state variable is set to "ACTIVE". If the state variable is not set to "ACTIVE", the method may proceed to Step 408.

In Step 408, a determination is made about whether the counters n_EORs and n_KAs are both zero. If n_EORs=0 and n_KAs=0, indicating that there are no peer BGP network devices with established BGP sessions, or that all peer BOP network devices with established BGP sessions have sent route updates, the method may proceed to Step 410.

In Step 410, a determination is made about whether the system configuration of the network device includes dynamic peer BGP network devices. If the system configuration does not include dynamic peer BGP network devices, the method may proceed to Step 412.

In Step 412, a determination is made about whether all the network devices identified as peer BGP network devices in the system configuration of the network device have established BGP sessions with the network device. If all peer BGP network devices have established BGP sessions with the network device, the method may proceed to Step 414.

In Step 414, the state variable is set to "CONVERGED". The declaration of convergence causes the convergence process to exit the concurrently executed Steps 202, 204 and 206 in FIG. 2.

Returning to Step 412, if not all the network devices identified as peer BGP network devices in the system configuration of the network device have established BGP sessions with the network device, the method may proceed to Step 416.

Returning to Step 410, if a determination is made that the system configuration of the network device does include dynamic peer BGP network devices, the method may proceed to Step 416.

Returning to Step 408, if a determination is made that the counters n_EORs and n_KAs are not both zero, thus indicating that there are outstanding route updates potentially to be received, the method may proceed to Step 416.

Returning to Step 406, if a determination is made that the state variable is set to "ACTIVE", the method may proceed to Step 414.

In Step 414, the state variable is set to "CONVERGED". The declaration of convergence causes the convergence process to exit the concurrently executed Steps 202, 204 and 206 in FIG. 2.

In Step 416, a determination is made about whether the time elapsed since the beginning of the BGP convergence phase is within the time limit specified by C_TIMEOUT. In one embodiment of the invention, C_TIMEOUT may be, for example, set to 300 seconds. If the time elapsed since the beginning of the BGP convergence phase is within the time limit specified by C_TIMEOUT, the method may proceed to Step 418.

In Step 418, a determination is made about whether the $1^{st}$ peer uptime exceeds the time limit specified by I_P_TIMEOUT. The $1^{st}$ peer uptime is the time elapsed since a peer BGP network device has established the first BGP session with the network device. The condition in Step 418 is intended to provides additional time, up to the time specified by I_P_TIMEOUT, for slower peer BGP network devices to establish BGP sessions with the network device. If the $1^{st}$ peer uptime has not exceeded the time limit specified by I_P_TIMEOUT, the method may proceed to Step 420.

In Step 420, a determination is made about whether the time elapsed since the beginning of the BGP convergence phase is equal to or greater than the time limit specified by C_TIMEOUT. If the time elapsed since the beginning of the BGP convergence phase is equal to or greater than the time limit specified by C_TIMEOUT, the method may proceed to Step 414.

In Step 414, the state variable is set to "CONVERGED". The declaration of convergence causes the convergence process to exit the concurrently executed Steps 202, 204 and 206 in FIG. 2.

Returning to Step 420, if a determination is made that the time elapsed since the beginning of the BGP convergence phase is below the time limit specified by C_TIMEOUT, the method may proceed to Step 422.

In Step 422, the timer is reset to the timeout value specified by I_P_TIMEOUT. Subsequently, the method may return to Step 402.

Returning to Step 418, if a determination is made that the $1^{st}$ peer uptime exceeds the time limit specified by I_P_TIMEOUT, the method may proceed to Step 424.

Returning to Step 416, if a determination is made that the time elapsed since the beginning of the BGP convergence phase is equal to or exceeds the time limit specified by C_TIMEOUT, the method may proceed to Step 424.

In Step 424, the state variable is set to "ACTIVE".

In Step 426, a determination is made about whether the counters n_EORs and n_KAs are both zero. If n_EORs=0 and n_KAs=0, indicating that there are no peers BGP network devices with established BGP sessions, or that all peer BOP network devices with established BGP sessions have sent route updates, the method may proceed to Step 414.

In Step 414, the state variable is set to "CONVERGED". The declaration of convergence causes the convergence process to exit the concurrently executed Steps 202, 204 and 206 in FIG. 2.

Returning to Step 426, if a determination is made that the counters n_EORs and n_KAs are not both zero, thus indicating that there are outstanding route updates, the method may proceed to Step 428.

In Step 428, a determination is made about whether the time elapsed since the beginning of the BOP convergence phase is equal to or greater than the time limit specified by C_TIMEOUT. If the time elapsed since the beginning of the BGP convergence phase is within the time limit specified by C_TIMEOUT, the method may proceed to Step 430.

In Step 430, the timer is reset to the timeout value specified by C_TIMEOUT. Subsequently, the method may return to Step 402.

Returning to Step 428, if the time elapsed since the beginning of the BGP convergence phase is equal to or greater than the time limit specified by C_TIMEOUT, the method may proceed to Step 414.

In Step 414, the state variable is set to "CONVERGED". The declaration of convergence causes the convergence process to exit the concurrently executed Steps 202, 204 and 206 in FIG. 2.

Figure 4B:
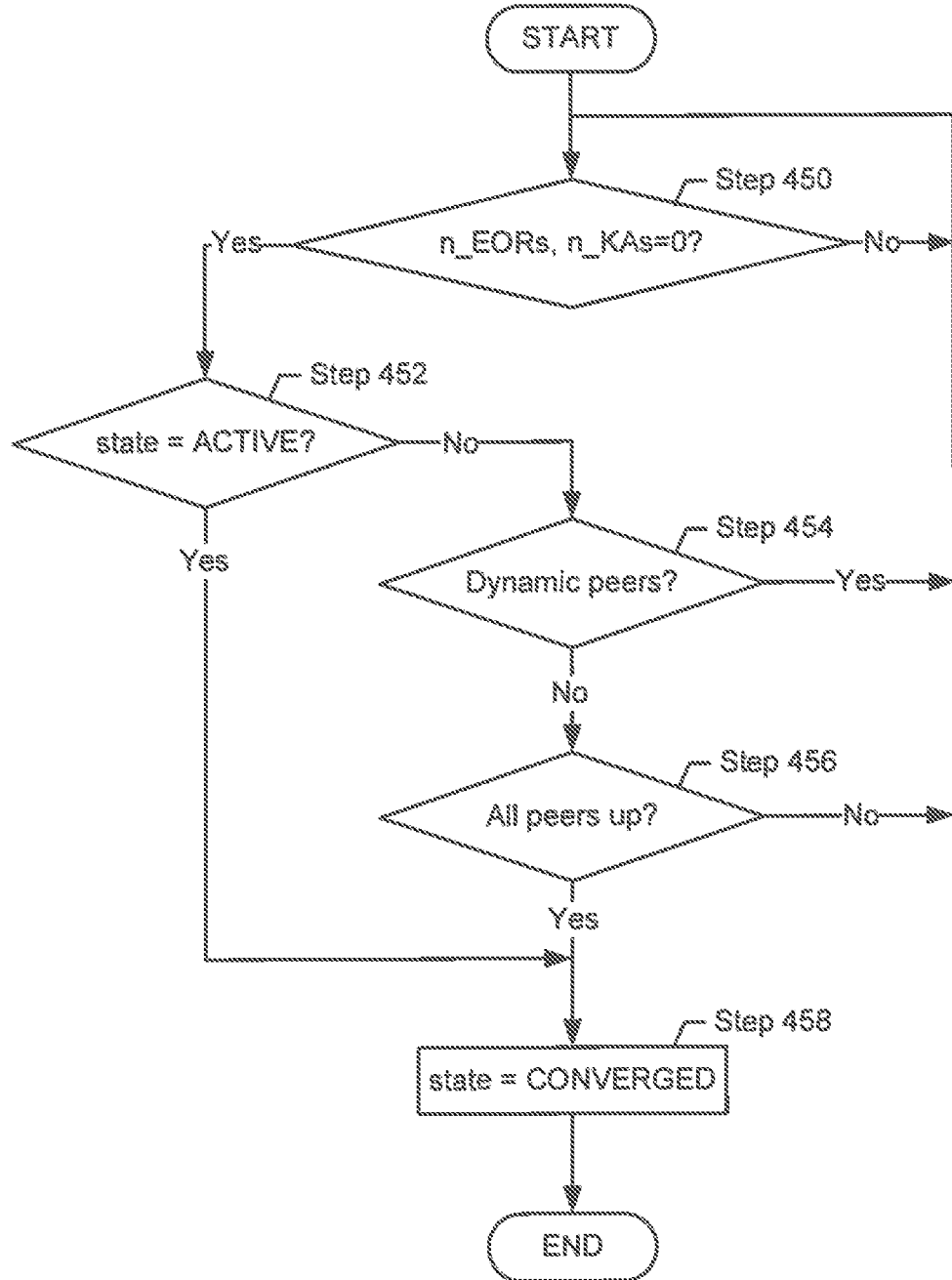

FIG. 4B shows a method for monitoring the progression of an ongoing BOP convergence process. The method shown in FIG. 4B is executed in conjunction with the method shown in FIG. 4A. While the method described in FIG. 4A primarily controls the timing of BGP convergence by setting and resetting a timer, as described above, the method of FIG. 4B controls the progression of convergence based on whether peer BGP network devices with established BGP sessions have sent updates, and based on whether dynamic peer BGP network devices are set up to connect to the network device. If dynamic peer BGP network devices are configured, convergence can only be achieved through the method described in FIG. 4A, thus giving the dynamic peer BGP network devices sufficient time to establish a BGP session and to send BGP updates. If dynamic peer BGP network devices are not configured, however, FIG. 4B may allow early convergence if all known peers have sent updates, without waiting for the timer described in FIG. 4A to expire.

Turning to FIG. 4B, in Step 450, a determination is made about whether the counters n_EORs and n_KAs are both zero. If n_EORs and n_KAs are not both zero, indicating that there are peer BGP network devices with established BGP sessions and outstanding route updates, the method may return to Step 450. If n_EORs=0 and n_KAs=0, indicating that there are no peer BOP network devices with established sessions, or that all peer BGP network devices with established sessions have sent route updates, the method may proceed to step 452.

In Step 452, a determination is made about whether the state is "ACTIVE". The state may be set to "ACTIVE" in Step 424 of FIG. 4A, as described above. If the state is not "ACTIVE", the method may proceed to Step 454.

In Step 454, a determination is made about whether the system configuration of the network device includes dynamic peer BGP network devices. If the system configuration includes dynamic peer BGP network devices, the method may return to Step 450. If the system configuration does not include dynamic peer BGP network devices, the method may proceed to Step 456.

In Step 456, a determination is made about whether all peer BGP network devices identified as BGP peers in the system configuration of the network device have established BGP sessions with the network device. If not all peer BGP network devices identified as BGP peers in the system configuration of the network device have established BGP sessions with the network device, the method may return to Step 450. If all peer BGP network devices have established BGP sessions with the network device, the method may proceed to Step 458.

Returning to Step 452, if a determination is made that the state is "ACTIVE", the method may proceed to Step 458.

In Step 458, the state is set to "CONVERGED". The declaration of convergence causes the convergence process to exit the concurrently executed Steps 202, 204 and 206 in FIG. 2.

Figure 5:
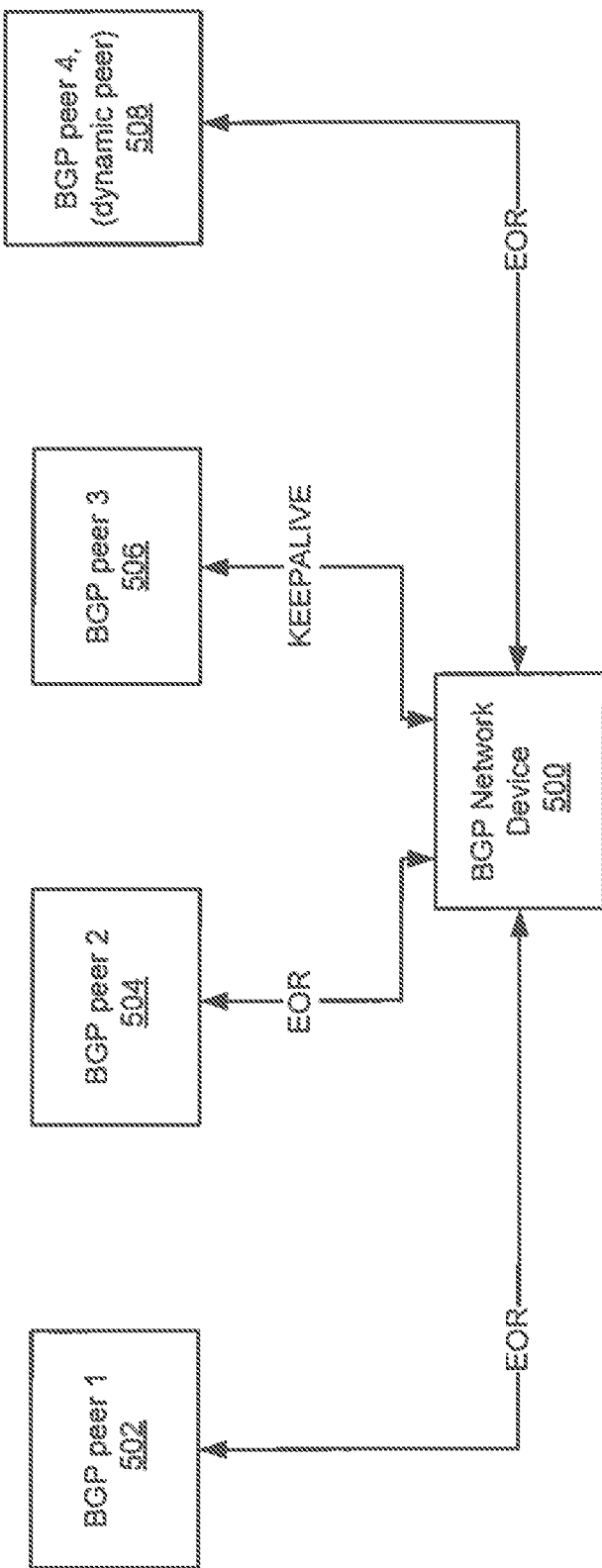
FIG. 5 shows a network that includes network devices in accordance with one or more embodiments of the invention.

FIG. 5 shows a scenario where a BGP network device (500) is initializing BGP and enters the BOP convergence phase, in accordance with one or more embodiments of the invention. The BGP network device is configured to attempt peering with four peer BGP network devices (502-508). All four peer BGP network devices are configured to provide route updates for the IPv4 address family. In the example scenario shown in FIG. 5, BGP peers 1 and 2 (502, 504) and dynamic BGP peer 4 (508) are EOR-sending-capable and therefore send an end of routing information base (EOR) marker after transmission of the route update. BGP peer 3 (506) does not support sending EORs and therefore does not send an EOR marker after the route update transmission. However, BGP peer 3 does send periodic KeepAlive markers. During the convergence phase, BGP sessions between the network device (500) and peer BGP network devices are established, and subsequently the network device receives route updates from the peer BGP network devices. After having received route updates from the peer BGP network devices, convergence is declared. Subsequently, the network device may identify best paths, use the identified best paths to populate the forwarding information base, advertise the identified best paths to the peer BGP network devices, and then activate the network device's routing services.

The use case scenario described below is intended to provide an example of the method for initializing BGP on a network device, described in FIGS. 2-4B. The use case scenario is based on the sample network shown in FIG. 5 and is for illustrative purposes only. The order of the steps described below may change, depending on the order of the BGP peers (502-508) establishing sessions with network device (500), and depending on when the BGP peers send route updates. The method described by FIGS. 2-4B is not limited to the network topology shown in FIG. 5, but rather is universally applicable to a wide range of networks of different topology, complexity and size.

Upon entering the convergence phase, the BGP network device (500) has loaded the information identifying BGP peers 1-3 (502-506), and their IP addresses. Further, BGP network device (500) has loaded information specifying that dynamic peer BGP network devices (508) may exist, and that the dynamic peers may have IP addresses in a certain range of IP addresses.

At time=t1, The BGP network device (500) initializes the BGP convergence tracking resources: The convergence timer is set to I_P_TIMEOUT=90 seconds. The timer is started. C_TIMEOUT is set to 300 seconds. The number of EORs is initialized to n_EORs=0. The number of KeepAlives is initialized to n_KAs=0. The number of peers is initialized to n_peers=3. The number of peers corresponds to the number of non-dynamic peers that the network device (500) has stored in its peer configuration database. The dynamic peer (508) is not included in the initial count of peers because there is no a priori knowledge about whether the dynamic peer will establish a BGP session with the network device. The number of established BGP sessions is initialized to n_established=0 (see e.g., Step 202, FIG. 2, and Step 400, FIG. 4A).

At time=t2, BGP peer 1 (502) establishes a BGP session with the BGP network device (500). Accordingly, the number of EORs is incremented to n_EORs=1 (see e.g., Step 304, FIG. 3). Further, the number of established BGP sessions is incremented to n_established=1. Because the number of EORs is not equal to zero, and the timer has not expired, other events may occur, while the process waits for the timer to expire (see e.g., FIG. 4B, Step 450).

At time=t3, The dynamic BOP peer 4 (508) sends an "Open" message to BGP network device (500) to indicate that dynamic BGP peer 4 (508) is available for peering. The IP address of dynamic BGP peer 4 (508) falls into the dynamic peer group listen range of the BGP network device (500). Accordingly, the number of peers is incremented to n_peers=4.

At time=t4, BGP peer 2 (504) establishes a BGP session with the BGP network device (500). Accordingly, the number of EORs is incremented to n_EORs=2 (see e.g., Step 304, FIG. 3). Further, the number of established BGP sessions is incremented to n_established=2. Because the number of EORs is not equal to zero, and the timer has not expired, other events may occur, while the process waits for the timer to expire (see e.g., FIG. 4B, Step 450).

At time=t5, BGP peer 1 (502) sends route updates followed by an EOR marker to the BGP network device (500). Accordingly the number of EORs is decremented to n_EORs=1 (see e.g., FIG. 3, Steps 306-310). Because the number of EORs is not equal to zero, and the timer has not expired, other events may occur, while the process waits for the timer to expire (see e.g., FIG. 4B, Step 450).

At time=16, BGP peer 3 (506) establishes a BGP session with the BGP network device (500). Accordingly, the number of KeepAlives is incremented to n_KAs=1 (see e.g., FIG. 3, Step 312). Further, the number of established BGP sessions is incremented to n_established=3. Because neither the number of EORs nor the number of KeepAlives is zero, and the timer has not expired, other events may occur, while the process waits for the timer to expire (see e.g., FIG. 4B, Step 450).

At time=(7, the dynamic BGP peer 4 (508) establishes a BGP session with the BGP network device (500). Accordingly, the number of EORs is incremented to n_EORs=2 (Step 304, FIG. 3). Further, the number of established BGP sessions is incremented to n_established=4. Because the number of EORs is not equal to zero, and the timer has not expired, other events may occur, while the process waits for the timer to expire (see e.g., FIG. 4B, Step 450).

At time=t8, BGP peer 2 (504) sends route updates followed by an EOR marker. Accordingly, the number of EORs is decremented to n_EORs=1 (see e.g., FIG. 3, Steps 306-310). Because neither the number of EORs nor the number of KeepAlives is zero, and the timer has not expired, other events may occur, while the process waits for the timer to expire (see e.g., FIG. 4B, Step 450).

At time=t9, BGP peer 3 (506) sends route updates followed by a KeepAlive marker. Accordingly, the number of KeepAlives is decremented to n_KAs=0 (see e.g., FIG. 3, Steps 314-318). Because the number of EORs is not equal to zero, and the timer has not expired, other events may occur, while the process waits for the timer to expire (see e.g., FIG. 4B, Step 450).

At time=t10, the dynamic BGP peer 4 (508) sends route updates followed by an EOR marker. Accordingly, the number of EORs is decremented to n_EORs=0. The number of EORs and the number of KeepAlives are zero (see e.g., FIG. 4B, Step 450), the state is not "ACTIVE" (FIG. 4B, Step 452), dynamic BOP peers are configured (see e.g., FIG. 4B, Step 454) and the method therefore waits to provide additional time for sessions to be established by the dynamic BGP peers. Accordingly, other events may occur, while the process waits for the timer to expire (see e.g., FIG. 4B, Step 454).

At time=t11, the timer expires after 90 seconds (see e.g., FIG. 4A, Step 404). The state is "INIT" (see e.g., FIG. 4A, Step 406). The number of EORs and the number of KeepAlives are both zero (see e.g., FIG. 4A, Step 408). Dynamic BGP peers are configured (FIG. 4A, Step 410). Accordingly the method checks whether the time elapsed since the beginning of BGP convergence is less than the convergence time limit, C_TIMEOUT (see e.g., FIG. 4A, Step 416). Because the time elapsed since the beginning of BGP convergence is less than the convergence time limit, the method checks whether the first peer came up more than IP TIMEOUT seconds ago (see e.g., FIG. 4A, Step 418). Because the first peer did not come up more than I_P_TIMEOUT seconds ago, the timer is reset to IP TIMEOUT (see e.g., FIG. 4A, Step 422).

At time=t12, the timer expires again (e.g., after an additional 90 s) (see e.g., FIG. 4A, Step 404). The state is "INIT" (see e.g., FIG. 4A, Step 406). This time, the time elapsed since the first peer came up exceeds I_P_TIMEOUT seconds (see e.g., FIG. 4A, Step 418). Accordingly the method sets the state to "ACTIVE" (see e.g., FIG. 4A, Step 424). The number of EORs and the number of KeepAlives is zero (see e.g., FIG. 4A, Step 426), accordingly the state is set to "CONVERGED". The processes summarized by FIG. 2, Steps 204-208, are therefore terminated, and the method continues with post-convergence Steps 210-214 in FIG. 2.

If there were no dynamic peer groups configured on the BGP network device (500), the above flow of events would have diverged at time=t10:

At time=t10, the dynamic BGP peer 4 (508) sends route updates followed by an EOR marker. Accordingly, the number of EORs is decremented to n_EORs=0. The number of EORs and the number of KeepAlives are zero (FIG. 4B, Step 450), the state is not "ACTIVE" (see e.g., FIG. 4B, Step 452), dynamic BGP peers are configured (see e.g., FIG. 4B, Step 454), all peers are up (see e.g., FIG. 4B, Step 456). Accordingly, the state is set to "CONVERGED".

Embodiments of the invention may enable a network device to efficiently initialize BGP on the network device. Rather than repeatedly selecting best paths, writing next-hop information into the forwarding information base, and advertising of best paths to peer network devices each time a route update is received from a peer network device, the method delays the execution of these steps until the route updates from the peer network devices have been received. Performing these steps only once may reduce the computational load resulting from best path selection and writing next-hop information into the forwarding information base, and it may reduce network traffic generated by advertising of the best paths to the peer network devices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for initializing border gateway protocol (BGP) on network devices, the method comprising:
    initializing, by a first network device, a BPG session with a second network device, wherein the second network device is one of a plurality of peer network devices;
    receiving, by the first network device from the second network device, route updates and a first KeepAlive marker;
    updating a n_KA variable maintained by the first network device after receiving the first KeepAlive marker;
    after updating the n_KA variable,
        making a first determination that a duration since the first network device has attempted to establish the BGP session is less than a C_TIMEOUT value;
        making a second determination that a duration of the BGP session with the second network device exceeds an I_P_TIMEOUT value, wherein the C_TIMEOUT value is greater than the I_P_TIMEOUT value;
    after the first and second determination, making a third determination, using the n_KA variable, that the first network device has received route updates from each of the plurality of peer network devices;
    after making the third determination:
        updating, in the first network device, a routing information base (RIB) using route updates received from each of the plurality of peer network devices to obtain an updated RIB;
        updating, in the first network device, a forwarding information base (FIB) using the updated RIB; and
        advertising, to the plurality of peer network devices by the first network device, routes, wherein the routes are determined using the RIB.

2. The method of claim 1, further comprising:
    initializing, by the first network device, a second BPG session with a third network device, wherein the third network device is one of the plurality of peer network devices;
    receiving, by the first network device from the third network device, second route updates and a first end of routing information base (EOR) marker; and
    updating a n_EOR variable maintained by the first network device after receiving the first EOR marker, wherein making the third determination further comprises using the n_EOR variable.

3. The method of claim 2, further comprising:
    incrementing the n_EOR variable after establishing the second BGP session with the third network device.

4. The method of claim 2, further comprising:
    prior to initializing the BGP session:
        initializing, by the first network device, BGP convergence variables, wherein the BGP convergence variables comprise the n_KA variable and the n_EOR variable.

5. The method of claim 1, wherein the plurality of peer network devices only comprises peer network devices with Internet Protocol (IP) addresses known to the first network device.

6. The method of claim 1, wherein the plurality of peer network devices comprises peer network devices with Internet Protocol (IP) addresses known to the first network device and dynamic peer network devices.

7. The method of claim 1, wherein updating n_KA variable comprises incrementing the n_KA variable.

8. The method of claim 1, further comprising:
    incrementing the n_KA variable after establishing the BGP session with the second network device.

9. A network device, comprising:
    a processor programmed to:
        initialize a BPG session with a second network device, wherein the second network device is one of a plurality of peer network devices;
        receive route updates and a first KeepAlive marker from the second network device;
        update a n_KA variable after receiving the first KeepAlive marker;
        after updating the n_KA variable,
            make a first determination that a duration since the network device has attempted to establish the BGP session is less than a C_TIMEOUT value; and
            make a second determination that a duration of the BGP session with the second network device exceeds an I_P_TIMEOUT value, wherein the C_TIMEOUT value is greater than the I_P_TIMEOUT value;
        after making the first and second determination, make a third determination, using the n_KA variable, that the network device has received route updates from each of the plurality of peer network devices;
        after making the third determination:
            update a routing information base (RIB) using route updates received from each of the plurality of peer network devices to obtain an updated RIB;
            update a forwarding information base (FIB) using the updated RIB; and
            advertise, to the plurality of peer network devices, routes, wherein the routes are determined using the RIB.

10. The network device of claim 9, wherein the processor is further programmed to:
    initialize a second BPG session with a third network device, wherein the third network device is one of the plurality of peer network devices;
    receive, from the third network device, second route updates and a first end of routing information base (EOR) marker; and
    update a n_EOR variable after receiving the first EOR marker, wherein making the third determination further comprises using the n_EOR variable.

11. The network device of claim 9, wherein:
    the plurality of peer network devices comprises peer network devices selected from the group consisting of: peer network devices with Internet Protocol (IP) addresses known to the network device and a combination of peer network devices with IP addresses known to the network device and dynamic peer network devices.

12. The network device of claim 9, wherein the processor is further programmed to:
  increment the n_KA variable after establishing the BGP session with the second network device.

13. The network device of claim 9, wherein the network device is a multilayer switch.

14. A non-transitory computer readable medium comprising instructions, which when executed by a processor of a network device, enables the network device to:
  initialize a BPG session with a second network device, wherein the second network device is one of a plurality of peer network devices;
  receive, from the second network device, route updates and a first KeepAlive marker;
  update a n_KA variable maintained by the network device after receiving the first KeepAlive marker;
  after updating the n_KA variable,
    make a first determination that a duration since the network device has attempted to establish the BGP session is less than a C_TIMEOUT value; and
    make a second determination that a duration of the BGP session with the second network device exceeds an I_P_TIMEOUT value, wherein the C_TIMEOUT value is greater than the I_P_TIMEOUT value;
  after making the first and second determination, make a third determination, using the n_KA variable, that the network device has received route updates from each of the plurality of peer network devices;
  after making the third determination:
    update, in the network device, a routing information base (RIB) using route updates received from each of the plurality of peer network devices to obtain an updated RIB;
    update, in the network device, a forwarding information base (FIB) using the updated RIB; and
    advertise, to the plurality of peer network devices, by the network device, routes, wherein the routes are determined using the RIB.

* * * * *

UNITED STATES PATENT AND TRADEMARK OFFICE
CERTIFICATE OF CORRECTION

PATENT NO. : 10,805,201 B2  
APPLICATION NO. : 16/124175  
DATED : October 13, 2020  
INVENTOR(S) : Rajesh Semwal and Mohammad Imtiyaz Page 1 of 1

It is certified that error appears in the above-identified patent and that said Letters Patent is hereby corrected as shown below:

In the Claims

Column 15, Line 19 in Claim 1, the phrase "BPG" should read -- BGP --.

Column 15, Line 52 in Claim 2, the phrase "BPG" should read -- BGP --.

Column 16, Line 20 in Claim 9, the phrase "BPG" should read -- BGP --.

Column 16, Line 51 in Claim 10, the phrase "BPG" should read -- BGP --.

Column 17, Line 3 in Claim 12, the phrase "BPG" should read -- BGP --.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*